United States Patent [19]

Thompson

[11] Patent Number: 5,661,236
[45] Date of Patent: Aug. 26, 1997

[54] PAD PRODUCTION LOG TOOL

[75] Inventor: Laird B. Thompson, Dallas, Tex.

[73] Assignee: Mobil Oil Corporation, Fairfax, Va.

[21] Appl. No.: 653,528

[22] Filed: May 24, 1996

[51] Int. Cl.$^6$ .................................................. E21B 47/10
[52] U.S. Cl. .................... 73/152.18; 73/152.31; 73/152.33
[58] Field of Search .................. 73/152.18, 152.29, 73/152.31, 152.33, 152.32, 152.42, 861.04, 861.05, 861.27, 597, 627, 628, 229, 61.49, 61.75, 61.79, 64.53, 152.58

[56] References Cited

U.S. PATENT DOCUMENTS

| | | | |
|---|---|---|---|
| 3,076,334 | 2/1963 | Wiley | 73/152.33 X |
| 3,246,145 | 4/1966 | Higgins | 250/383 |
| 3,511,334 | 5/1970 | Zemanek, Jr. | 181/104 |
| 4,215,567 | 8/1980 | Vlcek | 73/61 |
| 4,571,693 | 2/1986 | Birchak et al. | 73/152.46 X |
| 4,754,839 | 7/1988 | Gold et al. | 73/152.55 X |
| 5,509,474 | 4/1996 | Cooke, Jr. | 73/152.33 X |
| 5,551,287 | 9/1996 | Maute et al. | 73/152.59 X |

OTHER PUBLICATIONS

Branagan, Paul et al., Tests Show Production Logging Problems in Horizontal Gas Wells, Jan. 10, 1994, Oil & Gas Journal, pp. 41–45.
Hill, A. D. et al., Production Logging Tool Behavior in Two–Phase Inclined Flow, Oct. 1982 Jrnl. of Pet. Tech., pp. 2432–2440.
Kelman, J. S., Biphasic Fluid Studies for Production Logging in Large–Diameter Deviated Wells, Nov. '93, The Log Analyst pp. 6–10.
Ding, Z. X., A Comparison of Predictive Oil/Water Holdup Models For Production Log Interpretation in Vertical and Deviated Wellbores, Jun. 19–22, 1994, SPWLA Logging Symposium, pp. 1–18.
Zhu, Ding et al., The Effect of Flow from Perforations on Two–Flow: Implications for Production Logging, Oct. '88, Society of Petroleum Engineers, pp. 267–275.

*Primary Examiner*—Michael Brock
*Attorney, Agent, or Firm*—Robert B. Furr, Jr.; Malcolm D. Keen

[57] ABSTRACT

A production logging tool includes a plurality of pads affixed on a log tool so that the pads are located on the outer periphery of the well and are directed toward the borehole center. In the preferred embodiment, eight pads are used, with two groups of four pads, each group is spaced apart on the production log tool. Each set of four includes two pairs spaced opposite each other, all four being placed at ninety degree intervals along the circumference of the wellbore. The second set of four pads are also placed at ninety degree intervals along the circumference of the wellbore, however, the group of pads for the second set are displaced forty-five degrees along the circumference of the wellbore from the group of pads for the first set. Each pad contains two hot wire anemometers for temperature measurement, a capacitor plate and an ultrasonic transducer pointed toward reflective plates mounted on the center of the production log tool. The present invention may also include orientation measuring devices, pressure measuring devices, centralizing equipment, etc. as included in many types of prior art tools.

16 Claims, 1 Drawing Sheet

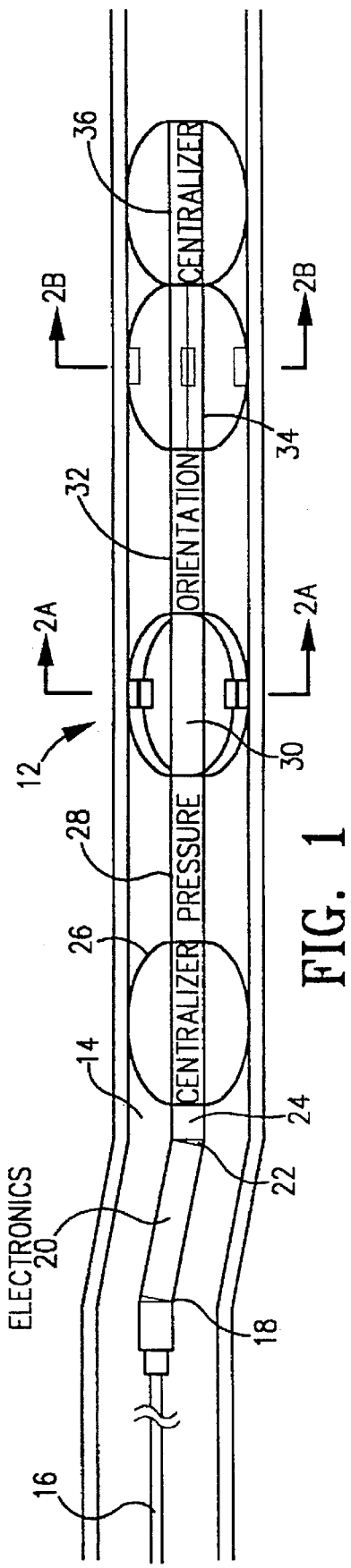
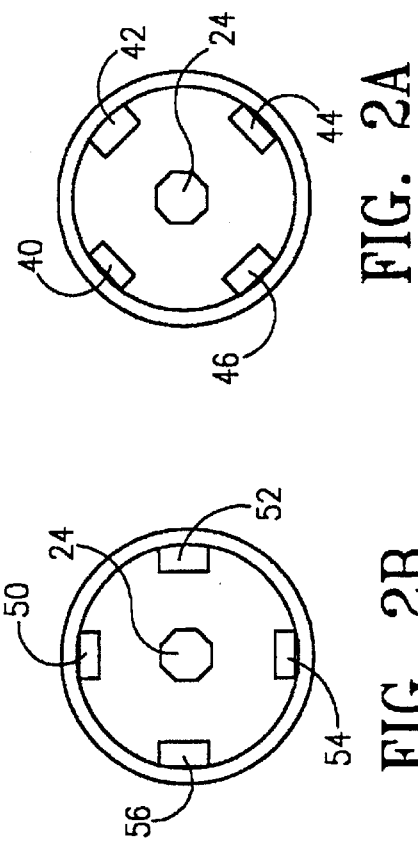
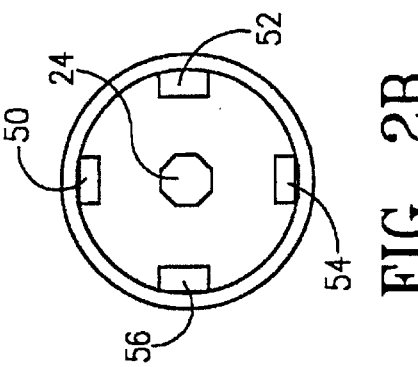
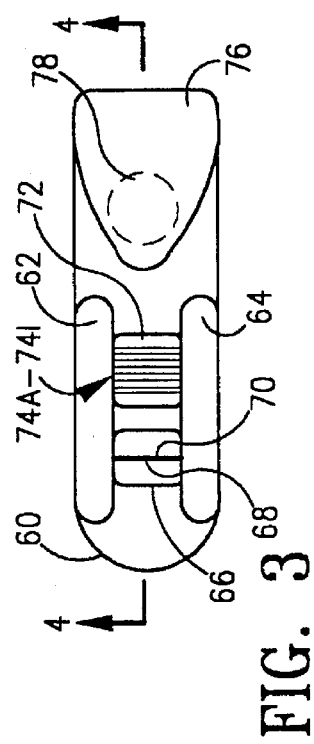
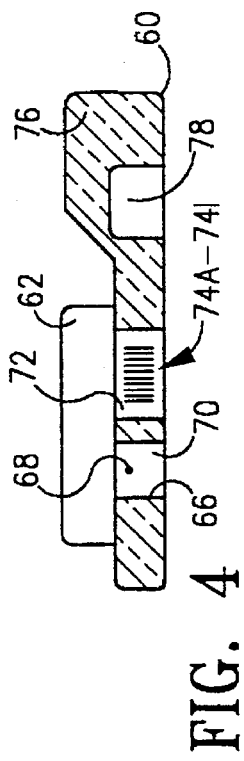

PAD PRODUCTION LOG TOOL

BACKGROUND OF THE INVENTION

1. Field of the Invention

The present invention pertains to well production logging tools and more particularly to well production logging tools that measure the flow of fluids into the well and are capable of determining the flow of various fluids within the well.

2. Related Prior Art

There are many methods and apparatus for measuring the fluid flow within a producing oil well. Some of these use ultra sound to determine interfaces and travel time within the fluid. Some representative patents of the state of the art production logging tools are as follows.

U.S. Pat. No. 3,454,085, titled "Well Installation with Plural Flow Meters", issued to J. H. Bostock relates to a well installation providing fluid flow communication between the earth surface and one or more earth formations penetrated by a well bore by means of a flow conductor which extends through the well bore. The flow conductor has vertically spaced ports between barriers which close the well bore about the flow conductor between each pair of such earth formations. The ports provide communication between the flow conductor and the earth formations. Flow meters mounted on the flow conductor are used to determine the rate of flow of fluid in the flow conductor above or below each port so that the rate of flow of fluids between each such earth formation and the flow conductor can be determined.

U.S. Pat. No. 5,138,585, titled "Method for Fluid Identification and Evaluation Within Wellbores Using Ultrasonic Scanning" issued to Jorg A. Angehru and Charles F. Magnani, relates to a method for using data from a borehole televiewer in an active well to determine flow properties. The method discussed in this patent involves determining the wall effects from the data, and factoring out the wall effects from the data to determine the fluid properties.

U.S. Pat. No. 3,603,145, titled "Monitoring Fluids in a Borehole" issued to Billy P. Morris, relates to a method and apparatus for monitoring flow and character of fluids in a borehole penetrating subterranean formations. This patent describes an apparatus that transmits acoustic energy through the borehole fluids between transducers in a downhole tool and discriminates intelligence bits from the acoustic energy arriving at the transducer serving as receiver. A portion of the acoustic energy is transmitted upstream and a portion of the acoustic energy is transmitted downstream. In one embodiment described in this patent, intermittent acoustic energy is employed and the intelligence bits are, respectively, the travel time downstream and the travel time upstream. This method purports to afford information as to the difference in the respective travel times which is related to velocity of the flow of the fluids and the average travel time which is related to the density of the fluids. In another embodiment described in this patent, intermittent or continuous acoustic energy is employed and the intelligence bits are respectively, apparent frequency and amplitude. The apparent frequency allegedly affords information as to frequency shift which is related to velocity of fluid flow. The amplitude is related to fluid density. Also disclosed are specific details of generating functions related to the received acoustic energy, and to the logging of the intelligence information with respect to depth.

U.S. Pat. No. 3,776,032, titled "Method and Apparatus for Detecting an Inflow of Fluid into a Well", issued to Charles B. Vogel, relates to a method and apparatus for detecting an inflow of fluid into a well during rotary drilling of the well. An inflow of gas is detected by an acoustic device and an inflow of water is detected by a resistivity device. The resulting information is transmitted to the surface by pressure pulses produced in the drilling fluid circulated during drilling.

In current practice, measurements are made in the central portion of the wellbore cross-section. These measurements are such as of spinner rotation rate, fluid density and dielectric constant. This data is then interpreted in an attempt to determine the flow rate at any point along the borehole. Influx (or exit) rate over any interval is then determined by subtracting the flowrates at the two end of the interval. However, in deviated and horizontal wells with multiphase flow, and also in some vertical wells such methods frequently give erroneous results due to the complex flow patterns within the wellbore giving non-representative readings. All prior art production logging measurements are made in these complex flow regimes in the central area of the borehole and yield non-representative results, or have other severe limitations.

SUMMARY OF THE INVENTION

The present invention includes a plurality of pads affixed on a log tool so that the pads are located on the outer periphery of the well and are directed toward the borehole center. In the preferred embodiment of the present invention, eight pads are used, with two groups of four spaced apart on the production log tool. Each set of four pads are spaced with pairs places opposite each other, the four pads being placed at ninety degree intervals along the circumference of the wellbore. The second set of pads are also placed at ninety degree intervals along the circumference of the wellbore, however, the pads of the second set are displaced forty-five degrees along the circumference of the wellbore from the pads of the first set. Each pad for the present invention contains two hot wire anemometers for temperature measurement, a capacitor plate and an ultrasonic transducer pointed toward reflective plates mounted on the center of the production log tool. The plates mounted at the center of the tool form an octagon so that each pad has its concomitant surface off of which ultrasonic waves may be reflected. The present invention may also include orientation measuring devices, pressure measuring devices, centralizing equipment, etc. as included in many types of prior art tools.

BRIEF DESCRIPTION OF THE DRAWINGS

FIG. 1 is a diagram of a production logging tool within a producing wellbore.

FIG. 2A is a top view of a portion of the logging tool of FIG. 1 taken along lines 2A—2A.

FIG. 2B is a top view of a second portion of the logging tool of FIG. 1 taken along lines 2B—2B.

FIG. 3 is a plan view of one pad structure of the pads located on the production logging tool of FIG. 1.

FIG. 4 is a cross sectional view of the pad structure of FIG. 3 taken along the lines 4—4.

DESCRIPTION OF THE PREFERRED EMBODIMENT

The present invention discloses a production logging tool that includes a plurality of pads affixed on the tool so that the pads are located on the outer periphery of the well and include portions that are directed toward the borehole center. In the preferred embodiment of the present invention, eight pads are used, with two groups of four pads, each group is spaced apart on the production log tool. Each group of four pads includes two pairs spaced opposite each other, all four being placed at ninety degree intervals along the circumference of the wellbore. The second group of four pads are displaced forty-five degrees along the circumference of the wellbore from the first group of pads.

Each pad contains two hot wire anemometers for temperature measurement, a capacitor plate and an ultrasonic transducer pointed toward reflective plates mounted on the center of the production log tool. The present invention may also include orientation measuring devices, pressure measuring devices, centralizing equipment, etc. as included in many types of prior art tools.

Referring now to FIG. 1, a production logging tool 12 in accordance with the present invention is illustrated in a horizontal portion of a wellbore 14. Attached to logging pipe 16 via knuckle joint 18 is electronics package 20. Connected to electronics package 20 through knuckle joint 22 is logging tool body 24 including top centralizer section 26, pressure sensor section 28, a first pad section 30, orientation sensor section 32, a second pad section 34 and bottom centralizer section 36.

Referring now to FIGS. 2A and 2B, pad sections 30 and 34 are illustrated as being rotated 45 degrees one relative to the other. Each pad section 30 and 34 has four pads on each pad section, pads 40, 42, 44 and 46 on pad section 30 and pads 50, 52, 54 and 56 on pad section 34. Pads 40, 42, 44 and 46 are oriented orthogonal to each other on pad section 30 and pads 50, 52, 54 and 56 are oriented orthogonal to each other on pad section 34. This arrangement provides a total of eight pads making a measurement every 45 degrees around the borehole. In the preferred embodiment orientation sensor section 32 is included so that the location of pad 40 is known so that the orientation (measuring) can be determined.

In the present invention, pads 40, 42, 44 and 46 of pad section 30 and pads 50, 52, 54 and 56 of pad section 34 are located on production logging tool 12 such that they are pushed against the side of borehole 14. Pads 40–46 and 50–56 are dragged along the side of borehole 14 and are used to measure fluids coming into the hole at the point where they come in, either through casings over a perforation, or in an open hole where pads 40–46 and 50–56 cross a fracture or a permeable formation which is producing gas or liquid into borehole 14 itself.

Referring now to FIG. 3, a plan view of pad 40 of pads 40–46 and 50–56 is illustrated. Pad 40 is described, however, it is to be understood that pad 40 is representative of all the pads, 40–46 and 50–56, each containing the same components.

Pad 40 includes base 60 with two ridges 62 and 64 that ride on the wall of borehole 14 and keep pad 40 approximately one quarter inch from the borehole wall. This keeps pad 40 from caking with mud or other substances from the side of borehole 14. Located in opening 66 are two hot wire anemometers 68 and 70. Located in opening 72 are capacitance plates 74A–74I.

By locating anemometers 68 and 70 and capacitance plates 74A–74I in openings 66 and 72, respectively, along with ridges 62 and 64, the material can flow in from the front and down across anemometers 68 and 70 and capacitance plates 74A–74I or out through the back of openings 66 and 72. One reason for this operation is that if this tool is used in an open hole, mud cake or gunk on the side of borehole 14 occurs often. If capacitance plates 74A–74I were up against the wall, they could get clogged up very quickly. By moving them away from the side of borehole 14 in the little standoff configuration resulting from ridges 62 and 64, capacitance plates 74A–74I are a little bit off the edge of borehole 14 and less likely to be clogged with mud cakes.

An objective of pad 40 is to determine the type of fluid which surrounds it. For this reason, it contains capacitance plates 74A–74I across where the capacitance difference can be measured to determine whether the fluid in which it is immersed is oil or water. Capacitor plates 74A–74I are open to influxing fluid. This allows measurement of the dielectric constant of the influxing fluid to distinguish water from hydrocarbons, and possibly oil from gas. The measurement of capacitance is indicated by a capacitance indicator located as part of electronics 20, (see FIG. 1). In the preferred embodiment, capacitance plates 74A–74I are vertical plates approximately one quarter inch high each and very thin, although any size may be used as long as the dielectric constant of the influxing fluid can be measured.

The preferred embodiment of the present invention also includes two hot wire anemometers 68 and 70, one on top of the other, so that the cooling effect of gas coming in can be monitored. Using the Bernuli effect, if a gas travels across a wire of known heat value, the rate with which it cools gives you the flow rate across the wire. And that pad is going to be at the borehole wall or at the casing wall. The purpose for having two hot wire anemometers 68 and 70 is to see which one gets cooler first so that the direction of the flow can be determined and whether the flow is coming into borehole 14 or whether the flow is actually moving out of the casing.

Mounted within thick portion 76 of pad 40 is transducer 78. In operation, pad 40 is pushed against the side of borehole 14, with ridges 62 and 64 along with thick portion 76 in contact with the side of borehole 14.

The point of ultrasonic transducer 78, then, is that it is looking inward toward the center of borehole 14 and it looks inward at the liquids, the oil or water. And as you see from FIGS. 2A and 2B, tool body 24 itself is octagonal so that each transducer 78 is looking at a small metal plate oriented perpendicular to the transducer beam, so that it can reflect the incoming sound. If borehole 14 were filled with water and the water were stationary, a sonic ray path would go from transducer 78, to tool body 24 and return to transducer 78.

One of the measurements taken is the travel time of the acoustic energy pulse. The travel time is how long it took to go in and return. A second measurement taken is the amplitude of the sound that you send out and the amplitude of the sound that returns. In a theoretical base case, all that is seen is a little plate from each one of the eight pads orientated around the side of borehole 14 inserted in a homogenous fluid. In practice, though, is that an oil-water segregated flow will exist where you have oil on the high side and water on the low side. It turns out that oil sound transmissibility is at a different speed than water sound transmissibility. You can detect the change in the travel time from transducer 78 to the tool body 24 and back. From this change in travel time, the location of the oil-water interface in a two-phase flow can be determined. From this calculation, the measurement of the volume of oil versus the volume of water can be made. If a segregated flow occurs, one where gas is on the high side and liquid on the low side, transducers in the gas area will be blind, basically, because a signal is sent out and it never is reflected back. Acoustic energy pulses cannot be generated in a gas. However, signals will be detected from the transducers which are below that gas-liquid interface. With this information, volumetric information between the blind transducers and the transducers that can see can be obtained.

If a situation occurs where a gas slug flow exists, one where slugs of gas on the high side are moving from downhole to uphole and the precise location of the transducers is known, additional information may be obtained. If the distance from one to the next is, for example, three feet apart or four feet apart, the time it takes each slug to move over the distance can be taken and the volumetric of gas rates can be derived.

The apparatus of the present invention provides several types of readings. Sonic information, capacitance information, temperature, pressure, and orientation information about where the pads are in space are all provided. Using the apparatus of the present invention permits readings at the borehole wall to be taken with the pads and provides readings of material coming into the borehole as the pad crosses a perforation point, or a fracture, or a point of entry from formation. Information concerning the flow regime and the flow material from the inside of the borehole are provided by the sonic transducers.

The apparatus of the present invention may be run in either one of two ways. The tool of the present invention may be operated while it is stationary in the hole as the fluid flows through. In the alternative, the tool of the present invention can be used in the dynamic sense where a logging run is taken and the tool is simply pulled back all the way across the formation.

If the tool is being operated in a cased hole situation where the depth of the perforation point is known, the tool is to be set beyond the perforation point, a set of readings are to be taken, log it across the perforation, then stop it again uphole from the perforation to get readings. This will provide a volumetric determination of what is entering at that perforation point. This can be done by a comparison of the volume above and below the perforation point.

The memory in electronics section 20 will have a one half gigabyte buffer where it collects all the data and may then be brought up to a surface monitor of a computer or the like for analysis. A dynamic tool is preferred where the data can be viewed as the logging is done. However, depending on down hole constraints for the logging run, a decision as to whether the tool is to be run dynamically or to be used in a stationary mode can be made.

Two readings are provided, travel time and amplitude, in digital form from sonic transducer 78. The first reading is the travel time of the generated acoustic pulse, the length of time it takes for the signal to go down, bounce off the plate and return. The second reading is the amplitude, the height of the returning acoustic pulse.

Acoustic transducer 78 may, by way of example, be a piezoelectric or bender-type transducer generating pulses of acoustic energy having a predominant frequency within the range of a few hertz to one-to-two megahertz. Such a transducer is illustrated and described in U.S. Pat. No. 4,649,525 to Agona and Zemanek, the teaching of which is incorporated herein by reference. The acoustic energy reflected from the borehole fluid flow is detected by the transducer and converted into electrical signals which are transmitted to electronics section 20 and may be eventually fed to the surface by way of suitable communication channels in logging pipe 16 where they are received by uphole circuitry (not shown).

Capacitance plates 74A–74I provide a single reading. This reading is the electrical capacitance of the fluid moving across the plates at that point in time.

Temperature sensors or anemometers 68 and 70 provide two digital readings, one from each wire in hot wire anemometer.

Pressure sensor 28 provides a single reading of the value of the pressure of the fluid in the hole at the point where tool 12 was located when the measurement was taken. Pressure section 28 may be a standard pressure measurement device, typical of what is currently used on current production logging PVT types of tools.

Orientation section 32 preferably contains a triaxial magnetometer accelerator arrangement. However, orientation packages that are standard with dip meters and borehole televiewers may be used.

In operation, one of the pads is designated as pad one. Orientation section 32 determines the orientation of pad one in three dimensional space. Whether pad one is facing up, down or sideways is determined. The orientation in the hole is viewed as to the orientation in 360 degrees. Whether pad one is north 45 east or north 78 east is determined and the hole deviation is deviation from horizontal. For example, whether the tool is fully horizontal with 0 deviation or 10 degrees deviated. In this example, 90 degree deviated is a horiontal hole. This determination allows physical placement of the readings in space relative to that borehole. This type of information is necessary to locate the up direction in the hole.

Hot-wire and hot-film anemometers 68 and 70 are normally operated in the constant temperature (CTA) mode. The resistance of the probe and, therefore, its temperature, is maintained as a constant. An output bridge voltage is related to the heat transfer from the probe and this in turn is related to the fluid parameter under consideration (usually the velocity). The bridge is maintained in balance by a voltage from a servo-amplifier. Any change in the resistance of anemometers 68 and 70 due to a change in the heat transfer will cause an unbalance in the bridge and simultaneously introduce an error voltage at the input to the servo-amplifier. This error voltage is amplified and fed back into the bridge to maintain balance via adjusted bridge voltage and sensor current. The temperature of the probe is thereby kept essentially constant and the thermal inertia of the probe is minimized. Due to the very high gain in the amplifier and the small mass of the sensor the system is capable of responding to very rapid fluctuations in velocity.

As an alternative, a thermopile measuring circuit can be used. Thermocouples are heated by alternating current. The changing DC output of the thermopile due to cooling by fluid flow is indicated by a meter. A change in ambient temperature develops voltage changes in thermocouples.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. A production logging tool for measuring fluid flow in a wellbore comprising:

a plurality of pads on a log tool body so that each of said plurality of pads are located on the outer periphery of the wellbore;

hot wire anemometers for temperature measurement located on each of said plurality of pads;

capacitor plate means located on each of said plurality of pads for detecting capacitance of the fluid;

ultrasonic transducer means located on each of said plurality of pads for generating ultrasonic waves toward the center of the wellbore and detecting reflected ultrasonic waves; and reflective plates mounted on the log tool body for receiving said ultrasonic waves and reflecting said ultrasonic waves back.

2. The production logging tool according to claim 1 wherein said plurality of pads includes eight pads, with a first group of four pads and a second group of four pads, each group spaced apart on the production log tool.

3. The production logging tool according to claim 2 wherein said first group of four pads includes two pairs spaced opposite each other, all four being placed at ninety degree intervals along the circumference of the wellbore.

4. The production logging tool according to claim 2 wherein said second group of four pads includes two pairs spaced opposite each other, all four being placed at ninety degree intervals along the circumference of the wellbore, said second group of four pads being displaced forty-five degrees along the circumference of the wellbore from said first group of four pads.

5. A production logging system with a production logging tool having reflective plates mounted on a logging tool body of the logging tool and a plurality of pads on the logging tool so that the pads are located on the outer periphery of the well, each pad comprising:

two hot wire anemometers for temperature measurement;

a capacitor plate; and an ultrasonic transducer pointed toward the reflective plates mounted on the logging tool body.

6. The producing logging system according to claim 5 also including orientation measuring devices.

7. The producing logging system according to claim 5 also including pressure measuring devices.

8. The producing logging system according to claim 5 also including centralizing equipment.

9. A production logging system with a production logging tool having reflective plates mounted on a logging tool body of the logging tool comprising:

a plurality of pads on the logging tool so that the pads are located on the outer periphery of the well.

10. The production logging tool according to claim 9 also including:

two hot wire anemometers for temperature measurement;

a capacitor plate; and an ultrasonic transducer pointed toward the reflective plates mounted on the center of the production log tool.

11. The production logging tool according to claim 10 wherein said plurality of pads includes:

eight pads, with two groups of four pads, each group is spaced apart on the production log tool.

12. The production logging tool according to claim 11 wherein:

each group of four pads includes two pairs of pads spaced opposite each other.

13. The production tool according to claim 12 wherein each pad of a first group of four pads being placed at ninety degree intervals along the circumference of the wellbore and a second group of four pads placed at ninety degree intervals along the circumference of the wellbore with said second group of four pads displaced forty-five degrees along the circumference of the wellbore from said first group of four pads.

14. The production logging tool according to claim 9 also including:

orientation measuring devices.

15. The production logging tool according to claim 9 also including:

pressure measuring devices.

16. The production logging tool according to claim 9 also including:

centralizing equipment.

* * * * *